US007013015B2

(12) United States Patent
Hohmann et al.

(10) Patent No.: US 7,013,015 B2
(45) Date of Patent: Mar. 14, 2006

(54) METHOD FOR THE OPERATION OF A HEARING AID DEVICE OR HEARING DEVICE SYSTEM AS WELL AS HEARING AID DEVICE OR HEARING DEVICE SYSTEM

(75) Inventors: Volker Hohmann, Oldenburg (DE); Volkmar Hamacher, Wuerselen (DE); Inga Holube, Bad Zwischenahn-Ofen (DE); Birger Kollmeier, Oldenburg (DE); Thomas Wittkop, Oldenburg (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 571 days.

(21) Appl. No.: 10/086,289

(22) Filed: Mar. 1, 2002

(65) Prior Publication Data

US 2002/0176594 A1 Nov. 28, 2002

(30) Foreign Application Priority Data

Mar. 2, 2001 (DE) ................................ 101 10 258

(51) Int. Cl.
*H04R 25/00* (2006.01)
*H04B 15/00* (2006.01)

(52) U.S. Cl. ........................... 381/318; 381/93; 381/83

(58) Field of Classification Search ................ 381/318, 381/93, 83, 94.1–94.3, 94.7, 312, 317, 315, 381/320

See application file for complete search history.

(56) References Cited

U.S. PATENT DOCUMENTS

| | | | | |
|---|---|---|---|---|
| 2,263,233 | A * | 11/1941 | Burck | 381/83 |
| 3,057,960 | A * | 10/1962 | Kaiser | 381/94.5 |
| 4,594,695 | A * | 6/1986 | Garconnat et al. | 367/135 |
| 4,658,426 | A * | 4/1987 | Chabries et al. | 381/94.3 |
| 4,932,063 | A * | 6/1990 | Nakamura | 381/94.7 |
| 4,956,867 | A * | 9/1990 | Zurek et al. | 381/94.7 |
| 5,033,090 | A | 7/1991 | Weinrich | |
| 5,402,496 | A | 3/1995 | Soli et al. | |
| 5,568,558 | A * | 10/1996 | Ramm et al. | 381/94.4 |
| 5,757,932 | A | 5/1998 | Lindemann et al. | |
| 5,991,419 | A * | 11/1999 | Brander | 381/312 |
| 6,072,884 | A | 6/2000 | Kates | |
| 6,549,633 | B1 * | 4/2003 | Westermann | 381/12 |
| 6,594,367 | B1 * | 7/2003 | Marash et al. | 381/92 |
| 6,778,674 | B1 * | 8/2004 | Panasik et al. | 381/313 |

FOREIGN PATENT DOCUMENTS

| | | |
|---|---|---|
| DE | 39 08 673 | 9/1989 |
| DE | 693 27 992 | 6/2000 |
| DE | 199 22 133 | 11/2000 |
| EP | 0 364 037 | 4/1990 |
| JP | 1-245660 | 9/1989 |
| WO | WO 91/08654 | 6/1991 |

* cited by examiner

*Primary Examiner*—Xu Mei
(74) *Attorney, Agent, or Firm*—Schiff Hardin LLP

(57) ABSTRACT

For reducing feedback-conditioned oscillations in a hearing aid device, microphone signals of a first microphone and of a distanced, second microphone are compared to one another. When oscillations are detected at the same frequency in both microphone signals, these oscillations are determined to be useful (non-feedback) tonal signals. Oscillations that are only present in one of the microphone signals, in contrast, are feedback-conditioned and are suppressed using suitable measures.

19 Claims, 2 Drawing Sheets

METHOD FOR THE OPERATION OF A HEARING AID DEVICE OR HEARING DEVICE SYSTEM AS WELL AS HEARING AID DEVICE OR HEARING DEVICE SYSTEM

BACKGROUND OF THE INVENTION

1. Field of the Invention

The invention is directed to a method for operating a hearing aid device or hearing device system having at least one first microphone for generating a first microphone signal and a second microphone distanced from the first for generating a second microphone signal. The invention is also directed to a hearing aid device or hearing device system for implementing the method.

2. Description of the Related Art

Acoustic feedback frequently occurs in hearing aid devices, particularly for hearing aid devices having a high gain. This feedback is expressed in pronounced feedback-caused oscillations having a specific frequency, called "whistling", that is usually extremely unpleasant both for the hearing aid user and as well as for people in the immediate surroundings.

Feedback can occur when sound that is picked up via the microphone of the hearing aid device is amplified by a signal amplifier and output via the earphone proceeds back to the microphone and is re-amplified. In order for the typical "whistling" to occur (usually at a dominant frequency), however, two further conditions must be met. First, the "loop amplification" of the system, i.e., the product of the hearing aid gain and the attenuation of the feedback path, must be greater than 1. Second, the phase shift of this loop amplification must correspond to an arbitrary whole-numbered multiple of 360°.

The simplest approach for reducing feedback-conditioned oscillations is to permanently reduce the hearing aid gain so that the loop amplification remains below the critical limit value even in unfavorable situations. The critical disadvantage of this approach, however, is that the hearing aid gain required given more pronounced hearing impairment can no longer be achieved as a result of this limitation.

Other approaches provide a measurement of the loop amplification during the hearing aid adaptation and reduce the hearing aid gain in designational fashion in the critical range with the assistance of what are referred to as notch filters (narrow-band blocking filters). Since the loop amplification, however, can constantly change during daily life, the benefit is likewise limited.

A number of adaptive algorithms have been proposed for dynamic reduction of feedback-conditioned oscillations, these automatically adjusting to the respective feedback situation and implementing corresponding measures. These methods can be roughly divided into two categories.

The first category comprises "compensation algorithms" that estimate the feedback part in the microphone signal with the assistance of adaptive filters and neutralize the feedback by subtraction and, thus, do not deteriorate the hearing aid gain. However, these compensation methods assume uncorrelated, i.e., ideally, "white", input signals. Tonal input signals that always exhibit a high time correlation lead to an incorrect estimate of the feedback path, which can lead to the fact that the tonal input signal itself is erroneously subtracted.

The second class contains the algorithms that only become active when feedback-conditioned oscillations are present. They generally contain a mechanism for detecting oscillations that continuously monitors the microphone signal. When feedback-typical oscillations are detected, the hearing aid gain is reduced to such an extent that the loop amplification drops below the critical limit. The gain reduction can ensue, for example, by lowering a frequency channel or by activating a suitable narrow-band stop filter (notch filter). This is disadvantageous because the oscillation detectors can fundamentally not distinguish between tonal input signals and feedback whistling. The result is that tonal input signals are interpreted as feedback oscillations and are then incorrectly reduced in level due to the reduction mechanism (for example, notch filters).

Delay elements that have a decorrelating effect are often introduced into the signal processing chain in the compensation algorithms in order to prevent tonal signal segments having a length characteristic for voice signals from being noticeably attacked. Due to echo effects and irritations as a result of desynchronized visual and auditive information, however, only delays in the range milliseconds are allowed. For example, the reduction of music to signals, which are often correlated over a clearly longer time span, cannot be avoided. A further counter-measure is comprised in retarding the adaptation of the filter so long that all relevant tonal useful signals are not attacked. However, this also results in the compensation filter no longer being able to follow rapid changes of the feedback path quickly enough, so that feedback-conditioned oscillations arise for a certain time and in turn disappear only when the feedback path has stabilized and the filter has again adequately adapted. The negative consequences of incorrect detection of oscillation detectors are countered in that the resulting reduction in gain occurs to only a limited extent, so that tonal useful signals erroneously considered to be feedback-conditioned oscillations (for example, alarm signals) still remain audible. This, however, harbors the risk that the reduction of gain in the feedback case does not suffice in order to fall below the critical limit and thus eliminate the "whistling".

In summary, the functioning of all adaptive feedback-reduction methods is deteriorated by input signals that exhibit a tonal character affected by dominant sine signal parts (for example, triangle tones, alarm signals). This often leads to unacceptable tonal deteriorations of the input signal.

German patent document DE 693 27 992 T2 discloses a feedback-suppression arrangement with adaptive filtering for a hearing prosthesis that comprises two microphones in a specific embodiment. It does not implement a detection of oscillations.

U.S. Pat. No. 6,072,884 A discloses a device for suppressing feedbacks that likewise comprises two microphones. It does not implement a detection or a comparison of oscillations.

German patent document DE 199 22 133 A1 discloses a hearing aid device with an oscillation detector. This device comprises only one microphone, so that a comparison of a plurality of microphone signals is not possible.

SUMMARY OF THE INVENTION

An object of the present invention is to provide a method for operating a hearing aid device or hearing device system as well as a hearing aid device or hearing device system that avoids feedback-conditioned oscillations without noticeably deteriorating the sound quality.

This object is inventively achieved by a method for operating a hearing aid device or hearing device system, comprising generating a first microphone signal from at least one first microphone; generating a second microphone signal from at least one second microphone that is distanced from the at least one first microphone; comparing the first microphone signal and the second microphone signal; recognizing feedback-conditioned oscillations based on the comparing; and reducing the feedback-conditioned oscillations when they are recognized as such.

This object is also achieved by a hearing aid device or hearing device system, comprising at least one first microphone configured to generate a first microphone signal; at least one second microphone distanced the first microphone configured to generate a second microphone signal; a signal processing unit configured to process the first microphone signal and the second microphone signal; a comparison unit configured to compare the first and second microphone signals or signals derived from them and to recognize feedback-conditioned oscillations; and a feedback-conditioned oscillation reducer.

The invention can be employed in all standard types of hearing aid devices, for example, given hearing aid devices to be worn behind the ear, hearing aid devices to be worn in the ear, implantable hearing aid devices or pocket devices. Furthermore, a hearing device system composed of a plurality of devices can also be utilized for serving a hearing-impaired person, for example, a hearing device system having two hearing devices worn at the head for binaural coverage. The microphone signals that are analyzed for the recognition of feedback-conditioned oscillations can then also proceed from different devices.

In the invention, microphone signals of at least two microphones distanced from one another are generated. At least one microphone must be arranged such that it does not pick up feedback-conditioned oscillations of a hearing aid device or at most picks them up in highly attenuated form. Useful signals, however, should be picked up by the appertaining microphones in a similar way. By analysis and comparison of the microphone signals or signals derived from them, a distinction can be made between feedback-conditioned oscillations and useful signals with high reliability. In particular, the microphone signals generated by the microphones also hardly differ given tonal useful signals so that these are recognized as useful signals. Feedback-conditioned signals, which differ from these, are picked up very differently by the microphones due to the arrangement of the microphones, so that these signals are recognized as feedback-conditioned from the comparison of the microphone signals and can be reduced with suitable measures.

The distance between the microphones whose microphone signals are compared to one another can, for example, be produced by attaching one microphone to a collar clip. Another possibility is to provide a hearing aid system having two hearing devices for binaural coverage. The comparison can then ensue between a microphone signal or a signal derived from it from the one hearing aid device to a microphone signal or a signal derived from it from the second hearing aid device. Useful signals are then registered in approximately the same way by the two microphones and feedback-conditioned oscillations that arise at a hearing aid device are not acquired by the other hearing aid device. A signal path is provided for the signal transmission between the hearing aid devices. The signal transmission can occur wirelessly or wire-bound. In order to keep the energy consumption required for the data transmission as low as possible, it is advantageous to not directly transmit the microphone signal but a signal derived from it. The derived signal comprises characteristic quantities of the microphone signal that are relevant for the recognition of oscillations. For example, these are the oscillation frequencies of the microphone signal and the signal strength at the respective oscillation frequencies.

When feedback simultaneously occurs in both hearing aid devices of a hearing device system, then it can still nonetheless be detected due to differences in the feedback. The differences can be caused, on the one hand, by different gain settings and frequency responses of the hearing aid devices, due to what is usually a different degree of hearing impairment at the two ears. On the other hand, individual variances of the feedback paths of the ears, for example, due to a different seating of the hearing aids, cause different oscillations.

Furthermore, device tolerances also contribute to the fact that feedback-conditioned oscillations occurring simultaneously in two different hearing aid devices differ. This means that there is a high probability that feedback-conditioned oscillations in the individual hearing aid devices occur at different frequencies. A tonal useful signal (for example, a sine signal), in contrast, appears at the same frequency at both sides. When an oscillation is detected at one side, then it is a feedback signal issue only when no oscillation at this frequency is detected from the microphone signal of the other hearing aid device. When, in contrast, an oscillation at the same frequency is detected at both hearing aid devices, then there is a great probability that this is a sine-shaped input signal.

In one embodiment of the invention, a correlation analysis is undertaken for comparing the microphone signals of two distanced microphones for recognizing feedback-conditioned oscillations. Different frequencies of feedback-conditioned oscillations in two microphone signals mean that no significant, correlated signal parts exist in the respectively other microphone signal for the oscillation signal of the one microphone. In the feedback case, the two microphone signals are thus only slightly correlated. In contrast, a high correlation is present in the case of a useful tonal signal. This is true not only of tonal signals; each signal coming from a useful sound source enters two hearing aid microphones distanced from one another with a high cross-correlation value.

When feedback-condition oscillations have been recognized from the comparison of microphone signals or signals derived from them, then reducing the hearing aid gain provides one possibility of suppressing these oscillations. When the signal processing in a hearing aid occurs in a plurality of parallel channels of a signal processing unit, then the hearing aid gain in one embodiment of the invention can be reduced only in the frequency channels in which feedback-conditioned oscillations are present.

The invention provides another possibility for reducing feedback-conditioned oscillations by eliminating these oscillations with narrow-band filters whose limit frequencies approximately coincide with the oscillation frequencies or with other feedback-conditioned oscillation reducers. For example, the filters can be implemented as notch filters. When one notch filter does not suffice, then further notch filters at the respective frequency are activated given a renewed detection of oscillations.

In another embodiment of the invention, when an adaptive filter for reducing feedback-conditioned oscillations is employed in a hearing aid device, then the adaptive compensation filter is adapted when feedback-conditioned oscillations are recognized. For example, the operating parameters of the filter can be varied such that the adaptation speed is increased. Conversely, the adaptation speed of the adaptive compensation filter is reduced when no feedback-conditioned oscillations are detected. This principle can be analogously applied to compensation filters based on the frequency range. Both the correlation analysis for recognizing feedback-conditioned oscillations as well as the regulation of the adaptation speed can advantageously take place in a frequency-specific manner.

When a hearing aid device of the invention recognizes feedback-conditioned oscillations on the basis of a correlation analysis of two microphone signals (cross-correlation), then there is a further possibility for reducing these oscillations by suppressing uncorrelated frequency parts of the microphone signals. Only those signal parts that are essentially uniformly present in all microphone signals are then further-processed.

DESCRIPTION OF THE DRAWINGS

Further details of the invention are explained in greater detail below on the basis of the exemplary embodiments shown in the drawings.

DETAILED DESCRIPTION OF THE INVENTION

Figure 1:
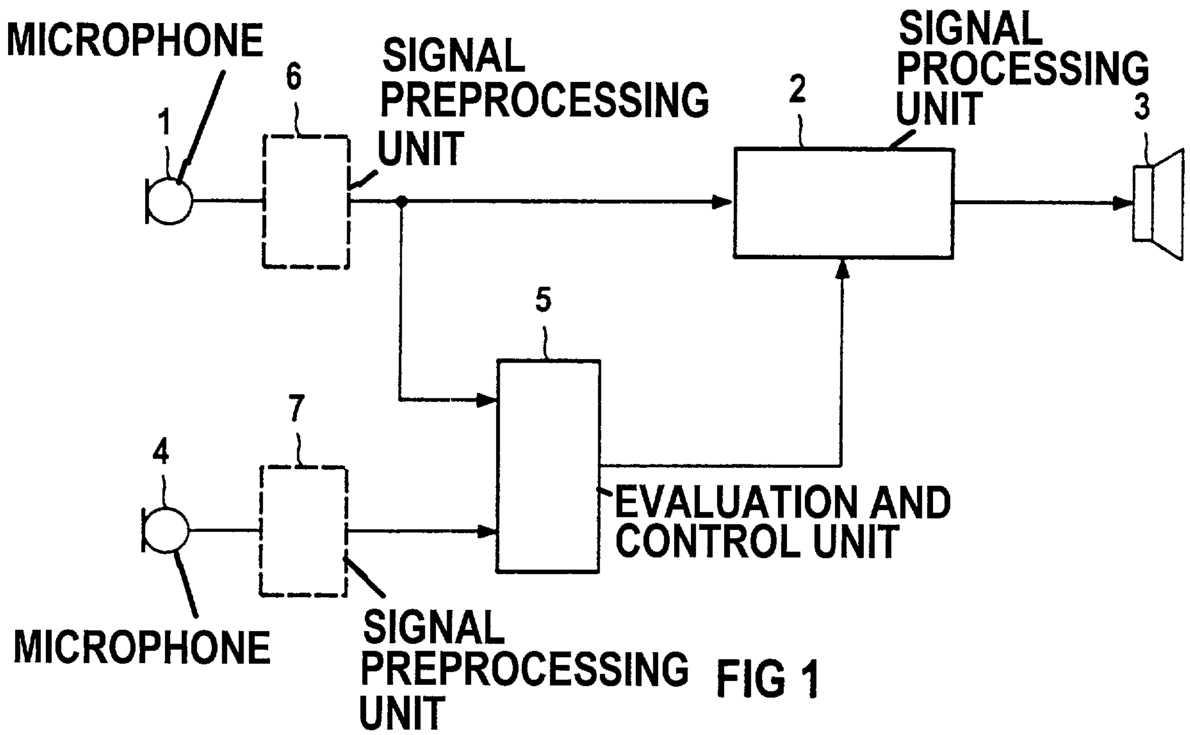
FIG. 1 is a schematic block diagram of a hearing aid device in which feedback-conditioned oscillations are recognized by comparing two microphone signals.

The hearing aid device schematically shown in FIG. 1 comprises a microphone 1, a signal processing unit 2 as well as an earphone 3. When sound from the earphone 3 proceeds back to the microphone 1, then feedback-conditioned oscillations (feedback) can arise. The conditions for this are that the "loop amplification" of the system, i.e., the product of the hearing aid gain and the attenuation of the feedback path, is greater than 1, and that the phase shift of this loop amplification corresponds to a whole-numbered multiple of 360°. Given the hearing aid device according to FIG. 1, a further microphone signal from a microphone 4 is supplied to an evaluation and control unit 5 in addition to the microphone signal of the microphone 1. The two microphones 1 and 4 are arranged such that useful sound is picked up approximately uniformly by both microphones. Sound proceeding from the earphone 3, however, cannot proceed to the microphone 4 or can at most proceed to it in a highly attenuated form. To this end, the microphone 4 is attached, for example, to a collar clip outside the housing in which the microphone 1 is arranged. The microphone signals proceeding from the microphones are analyzed and compared to one another in the evaluation and control unit 5. For example, oscillations in the individual microphone signals can be detected by auto-correlation analyses. When oscillations are present in both microphone signals, then their frequencies are identified and compared to one another. Given oscillations that are identically present in both microphone signals, there is a high probability that these are tonal input signals. When oscillations are present in only one microphone signal, particularly in the microphone signal proceeding from the microphone 1, there is a high probability that it is a result of feedback-conditioned oscillations. For eliminating these oscillations, the evaluation and control unit 5 implements an adaptation of the signal processing unit 2. For example, narrow-band notch filters can be activated and adapted for filtering out the oscillation frequencies in the signal processing unit 2.

As shown in FIG. 1, the microphone signals of the microphones 1 and 4 can also be initially supplied to a respective signal pre-processing unit 6 and 7. The signal pre-processing can comprise, for example, A/D conversion or a signal pre-amplification.

Figure 2:
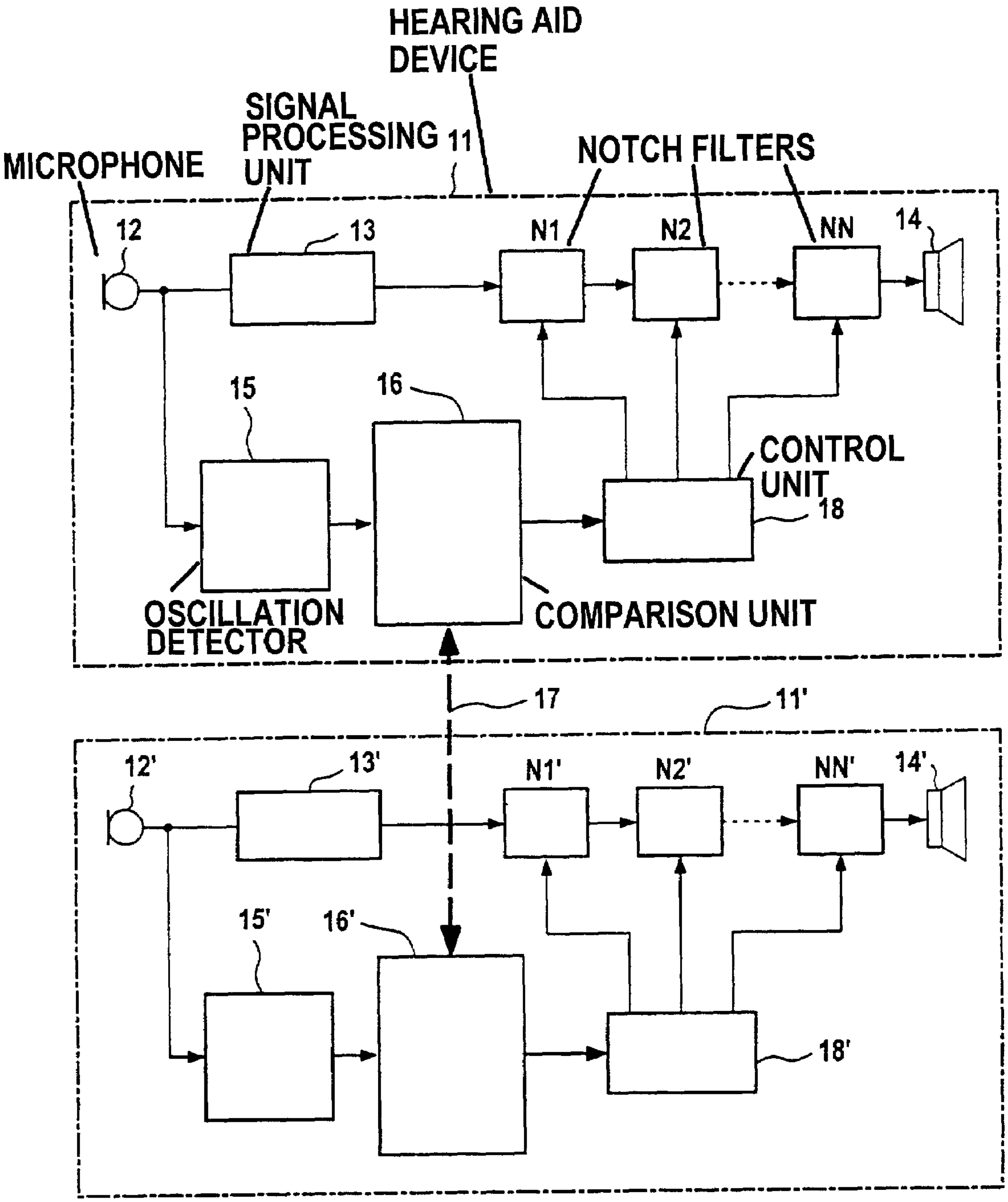
FIG. 2 is a schematic block diagram of two hearing aid devices between which a signal exchange is provided for recognizing feedback-conditioned oscillations.

FIG. 2 shows two hearing aid devices 11 and 11' each having a microphone 12, 12', a signal processing unit 13, 13' and an earphone 14, 14'. Respectively one oscillation detector 15, 15' monitors the microphone signal continuously for oscillations and identifies the oscillation frequencies when oscillations are detected. A signal path 17 for the signal exchange between the hearing aid devices exists between the hearing aid devices 11 and 11'; this can ensue wirelessly or wire-bound. According to the invention, an exchange of the detected oscillation frequencies ensues via the signal path 17. The oscillation frequencies of the appertaining hearing aid device are compared in the comparison units 16, 16' to the oscillation frequencies of the other hearing aid device. When the oscillation frequencies coincide, there is a high probability that these are not feedback-conditioned oscillations but rather reflects that the useful signal has a pronouncedly tonal character at these frequencies. When, in contrast, an oscillation is detected at a specific frequency in one hearing aid device when no oscillation is reported in the respectively other hearing aid device, then there is a high probability that this is a feedback-conditioned oscillation. The oscillation frequency is then forwarded to the control unit 18, 18'. This control unit calculates and activates a notch filter N1, N1' matching the present oscillation frequency. The activation of the notch filter N1, N1' reduces the gain at the frequency at which the oscillation was detected. The loop amplification drops below the critical limit for a narrow-band frequency range and the feedback-conditioned oscillation disappears. Since extremely narrow-band notch filters can be employed, the effect is limited to a narrow frequency range, so that noteworthy losses in gain or deteriorations of sound are avoided. When one notch filter does not suffice, then further notch filters N2 through NN or, respectively, N2' through NN' can be activated at the respective frequencies given renewed detection of oscillations.

The invention is not limited to the illustrated exemplary embodiments but can be expanded by a number of modifications. For example, more than two microphone signals can also be compared to one another for the recognition of feedback-conditioned oscillations. Furthermore, the signal processing in a hearing aid device of the invention can ensue in parallel in a plurality of channels of the signal processing unit. The comparison of microphone signals or the correlation analysis can then likewise ensue in parallel in a plurality of channels. Measures for reducing recognized feedback-conditioned oscillations are then advantageously limited only to the appertaining channels. Furthermore, the comparison or the correlation analysis of microphone signals can ensue continuously or only at times dependent on specific parameters (for example, the hearing program that has been set or the volume setting).

The particular implementations shown and described herein are illustrative examples of the invention and are not intended to otherwise limit the scope of the invention in any way. Indeed, for the sake of brevity, conventional electronics, control systems, optics, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical sensor device. Moreover, no item or component is essential to the practice of the invention unless the element is specifically described as "essential" or "critical".

The above-described method and apparatus are illustrative of the principles of the present invention. Numerous modifications and adaptations will be readily apparent to those skilled in this art without departing from the spirit and scope of the present invention.

| LIST OF REFERENCE CHARACTERS | |
|---|---|
| 1, 4, 12, 12' | microphone |
| 2, 13, 13' | signal processing unit |
| 3, 14, 14' | earphone |
| 5 | evaluation and control unit |
| 6, 7 | signal preprocessing unit |
| 11, 11' | hearing aid devices |
| 15, 15' | oscillations detector |
| 16, 16' | comparison unit |
| 17, 17' | signal path |
| 18, 18' | control unit |
| N1, N2, NN, N1', N2', NN' | notch filter |

What is claimed is:

1. A method for operating a hearing aid device or hearing device system, comprising:

generating a first microphone signal from at least one first microphone;

deriving one or more first identified oscillation values from the first microphone signal comprising characteristic quantities of the microphone signal that are relevant for recognizing oscillations;

generating a second microphone signal from at least one second microphone that is distanced from the at least one first microphone;

deriving one or more second identified oscillation values from the second microphone signal comprising characteristic quantities of the microphone signal that are relevant for recognizing oscillations;

transmitting the first identified oscillation values over a communication link between the first and second microphone after deriving the first identified values and subsequently inputting these values into a comparison unit associated with the second microphone;

inputting the second identified oscillation values into the comparison unit associated with the second microphone;

comparing the first identified oscillation values and the second identified oscillation values within the comparison unit;

recognizing feedback-conditioned oscillations based on the comparing; and reducing the feedback-conditioned oscillations when they are recognized as such.

2. The method for operating the hearing aid device or hearing device system according to claim 1, wherein recognizing feedback-conditioned oscillations comprises:

determining that an oscillation frequency is present in only one of the first microphone signal and the second microphone signal.

3. The method for operating the hearing aid device or hearing device system according to claim 1, wherein recognizing feedback-conditioned oscillations comprises:

performing a correlation analysis of the first microphone signal and the second microphone signal and determining that a feedback-conditioned oscillation is present at frequencies at which no correlated signal parts for an oscillation in the first microphone signal are present in the second microphone signal.

4. The method for operating the hearing aid device or hearing device system according to claim 1, wherein reducing the feedback-conditioned oscillations comprises reducing the hearing aid gain when feedback-conditioned oscillations are recognized.

5. The method for operating the hearing aid device or hearing device system according to claim 4, further comprising:

performing signal processing in a plurality of parallel channels of a signal processing unit; and reducing a hearing aid gain of a channel in which an oscillation frequency lies when feedback-conditioned oscillations are recognized.

6. The method for operating the hearing aid device or hearing device system according to claim 1, further comprising:

reducing recognized feedback-conditioned oscillations by at least one of activating filters and adapting filters.

7. The method for operating the hearing aid device or hearing device system according to claim 1, further comprising:

providing an adaptive compensation filter for reducing feedback-conditioned oscillations; and adapting the adaptive compensation filter when feedback-conditioned oscillations are recognized.

8. The method for operating the hearing aid device or hearing device system according to claim 1, further comprising:

reducing uncorrelated frequency parts of the first and second microphone signals for suppressing feedback-conditioned oscillations.

9. The method according to claim 1, wherein the identified oscillation values comprise at least one of oscillation frequencies of a respective microphone signal and a signal strength at a respective oscillation frequency.

10. A hearing aid device or hearing device system, comprising:

at least one first microphone configured to generate a first microphone signal at its output;

a first oscillation detector comprising an input that is connected to the output of the first microphone, and an output at which one or more derived first identified oscillation values are produced;

at least one second microphone distanced from the first microphone configured to generate a second microphone signal at its output;

a second oscillation detector comprising an input that is connected to the output of the second microphone, and an output at which one or more derived second identified oscillation values are produced;

a communications path over which the derived first identified oscillation values are transmitted:

a first signal processing unit configured to process the first microphone signal and a second signal processing unit configured to process the second microphone signal;

a comparison unit comprising an input connected to the communications path for receiving the derived first identified oscillation values and an input connected to the output of the second oscillation detector for receiving the derived second identified oscillations values, the comparison unit configured to compare the first and second microphone signals or signals derived from them and to recognize feedback-conditioned oscillations; and a feedback-conditioned oscillation reducer.

11. The hearing aid device or hearing device system according to claim 10, further comprising:

a first microphone signal oscillation detector configured to detect an oscillation and determine a first oscillation frequency in the first microphone signal;

a second microphone signal oscillation detector configured to detect an oscillation and determine a second oscillation frequency in the second microphone signal; and a comparison unit configured to compare the first oscillation frequency and the second oscillation frequency.

12. The hearing aid device or hearing device system according to claim 10, further comprising:

a correlation calculator configured to perform a correlation analysis of the first and second microphone signals.

13. The hearing aid device or hearing device system according to claim 10, further comprising:

a gain reducer configured to reduce the hearing aid gain.

14. The hearing aid device or hearing device system according to claim 10, further comprising:

a signal processing unit having a plurality of parallel channels; and a channel gain reducer configured to reduce hearing aid gain in one of the plurality of parallel channels.

15. The hearing aid device or hearing device system according to claim 10, further comprising:

adaptive filters with adjustable operating parameters configured to reduce recognized, feedback-conditioned oscillations.

16. The hearing device system according to claim 10, wherein the at least one first microphone for generating the first microphone signal is arranged in a first hearing aid device of the hearing device system, and the at least one second microphone for generating the second microphone signal is arranged in a second hearing aid device of the hearing device system.

17. The hearing aid system according to claim 16, further comprising a wireless signal path configured to transmit microphone signals or signals derived from them between the first hearing aid device and the second hearing aid device.

18. The hearing aid device or hearing device system according to claim 10, wherein the identified oscillation values comprise at least one of oscillation frequencies of a respective microphone signal and a signal strength at a respective oscillation frequency.

19. A hearing aid device or hearing device system, comprising:

at least one first microphone configured to generate a first microphone signal;

a means for converting the first microphone signal into one or more first identified oscillation values;

at least one second microphone distanced from the first microphone configured to generate a second microphone signal;

a means for converting the second microphone signal into one or more second identified oscillation values;

a transmission link via which the first identified oscillation values are transmitted;

a comparator means associated with the second microphone for comparing the first identified oscillation values after transmission over the transmission link with the second identified oscillation values that outputs an oscillation frequency value based on the comparison; and a means for reducing a feedback-conditioned oscillation in an output signal based on the oscillation frequency value created by the comparator means.

* * * * *